(12) United States Patent
Bushman et al.

(10) Patent No.: US 9,501,364 B1
(45) Date of Patent: Nov. 22, 2016

(54) HYBRID IMAGE BACKUP OF A SOURCE STORAGE

(71) Applicant: STORAGECRAFT TECHNOLOGY CORPORATION, Draper, UT (US)

(72) Inventors: Nathan S. Bushman, Pleasant Grove, UT (US); Scott Barnes, Pleasant Grove, UT (US); Thomas Russell Shreeve, Draper, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

(21) Appl. No.: 15/074,712

(22) Filed: Mar. 18, 2016

(51) Int. Cl.
| | | |
|---|---|---|
| *G06F 17/00* | (2006.01) | |
| *G06F 11/14* | (2006.01) | |
| *G06F 17/30* | (2006.01) | |
| *G06F 3/06* | (2006.01) | |

(52) U.S. Cl.
CPC ........... *G06F 11/1451* (2013.01); *G06F 3/067* (2013.01); *G06F 17/30067* (2013.01)

(58) Field of Classification Search
None
See application file for complete search history.

(56) References Cited

U.S. PATENT DOCUMENTS

| | | | | |
|---|---|---|---|---|
| 6,243,795 B1* | 6/2001 | Yang | .................. | G06F 11/1666 160/113 |
| 2010/0274765 A1* | 10/2010 | Murphy | .............. | G06F 11/1451 707/652 |
| 2010/0274982 A1* | 10/2010 | Mehr | .................. | G06F 11/1458 711/162 |
| 2011/0154709 A1* | 6/2011 | Rotharmel | ................ | F41A 9/25 42/69.01 |
| 2012/0233417 A1* | 9/2012 | Kalach | ................ | G06F 11/1469 711/162 |
| 2013/0006943 A1* | 1/2013 | Chavda | ............... | G06F 11/1448 707/652 |
| 2014/0082145 A1* | 3/2014 | Lacapra | .............. | H04L 67/1097 709/219 |
| 2016/0078068 A1* | 3/2016 | Agrawal | ................. | G06F 11/14 707/692 |

* cited by examiner

*Primary Examiner* — Hung Le
(74) *Attorney, Agent, or Firm* — Maschoff Brennan

(57) ABSTRACT

Creating hybrid image backups of a source storage. In one example embodiment, a method for creating one or more hybrid image backups of a source storage may include comparing hashes of allocated blocks stored in the source storage at a first point in time to hashes of blocks stored in a deduplication system to determine whether each of the allocated blocks is in a first set of blocks that are stored in the deduplication system or in a second set of blocks that are not stored in the deduplication system; associating locations of the blocks in the first set of blocks stored in the source storage with locations of the corresponding blocks stored in the deduplication system; determining whether the deduplication system is in a read-only state or in a writable state; and in response to the deduplication system being in the read-only state: storing the blocks in the second set of blocks in an image backup separate from the deduplication system; associating locations of the blocks in the second set of blocks stored in the source storage with locations of the corresponding blocks stored in the image backup; and defining a full hybrid image backup of the source storage at the first point in time as a combination of the first set of blocks stored in the deduplication system and the second set of blocks stored in the image backup.

16 Claims, 7 Drawing Sheets

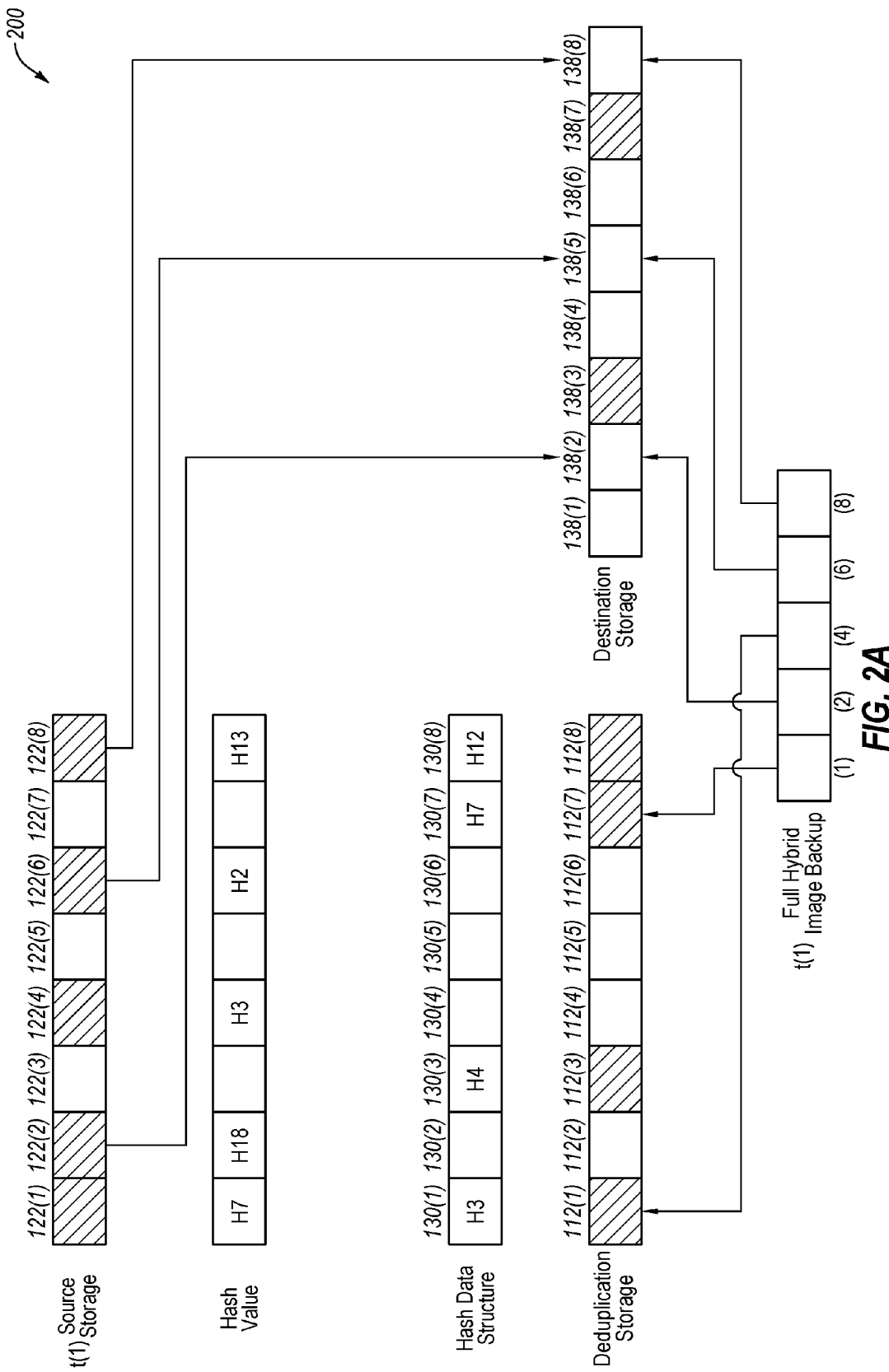

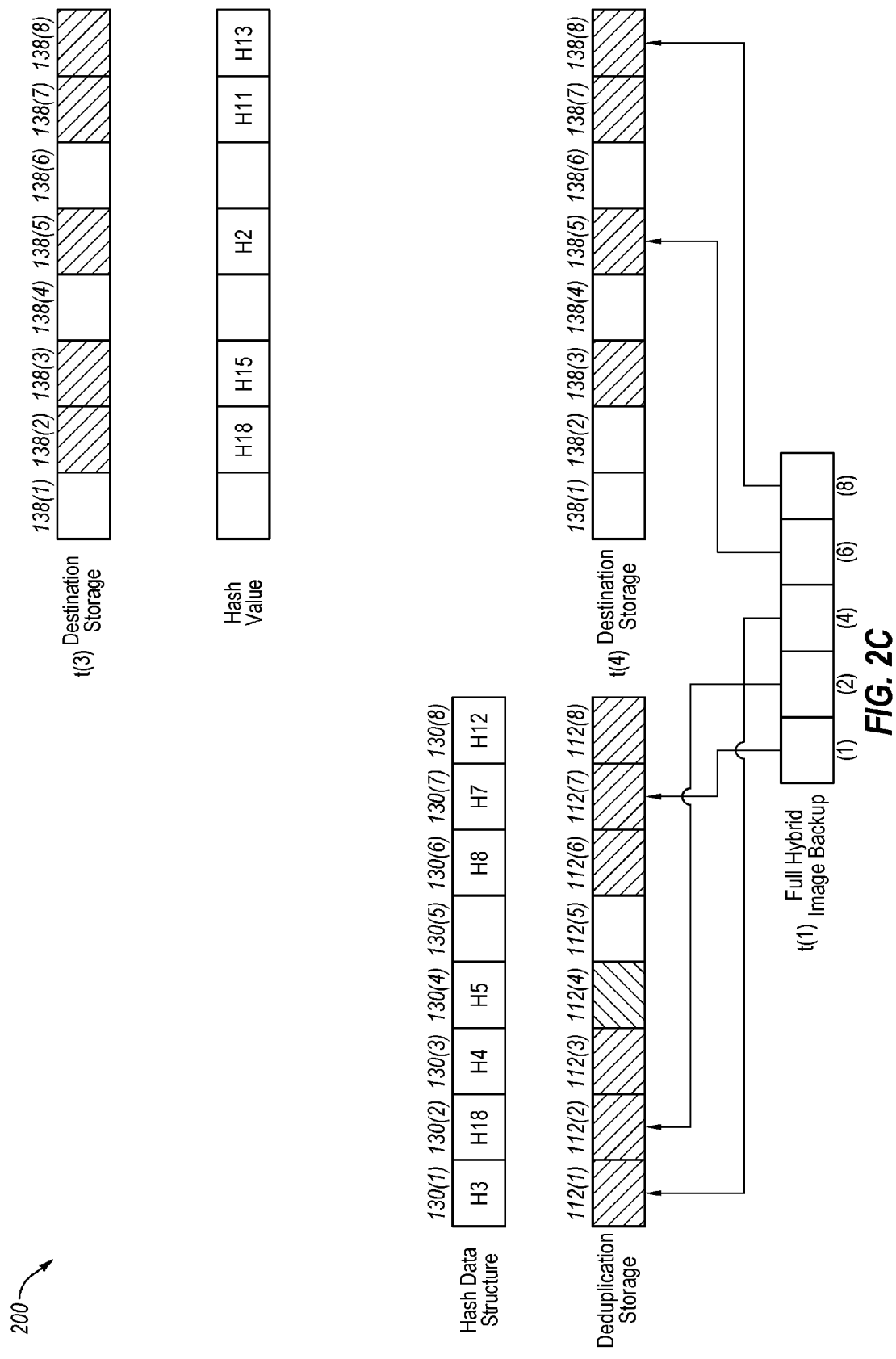

HYBRID IMAGE BACKUP OF A SOURCE STORAGE

FIELD

The embodiments disclosed herein relate to creating hybrid image backups of a source storage.

BACKGROUND

A storage is computer-readable media capable of storing data in blocks. Storages face a myriad of threats to the data they store and to their smooth and continuous operation. In order to mitigate these threats, a backup of the data in a storage may be created to represent the state of the source storage at a particular point in time and to enable the restoration of the data at some future time. Such a restoration may become desirable, for example, if the storage experiences corruption of its stored data, if the storage becomes unavailable, or if a user wishes to create a second identical storage.

A storage is typically logically divided into a finite number of fixed-length blocks. A storage also typically includes a file system which tracks the locations of the blocks that are allocated to each file that is stored in the storage. The file system also tracks the blocks that are not allocated to any file. The file system generally tracks allocated and unallocated blocks using specialized data structures, referred to as file system metadata. File system metadata is also stored in designated blocks in the storage.

Various techniques exist for backing up a source storage. One common technique involves backing up individual files stored in the source storage on a per-file basis. This technique is often referred to as file backup. File backup uses the file system of the source storage as a starting point and performs a backup by writing the files to a destination storage. Using this approach, individual files are backed up if they have been modified since the previous backup. File backup may be useful for finding and restoring a few lost or corrupted files. However, file backup may also include significant overhead in the form of bandwidth and logical overhead because file backup requires the tracking and storing of information about where each file exists within the file system of the source storage and the destination storage.

Another common technique for backing up a source storage ignores the locations of individual files stored in the source storage and instead simply backs up all allocated blocks stored in the source storage. This technique is often referred to as image backup because the backup generally contains or represents an image, or copy, of the entire allocated contents of the source storage. Using this approach, individual allocated blocks are backed up if they have been modified since the previous backup. Because image backup backs up all allocated blocks of the source storage, image backup backs up both the blocks that make up the files stored in the source storage as well as the blocks that make up the file system metadata. Also, because image backup backs up all allocated blocks rather than individual files, this approach does not necessarily need to be aware of the file system metadata or the files stored in the source storage, beyond utilizing minimal knowledge of the file system metadata in order to only back up allocated blocks since unallocated blocks are not generally backed up.

An image backup can be relatively fast compared to file backup because reliance on the file system is minimized. An image backup can also be relatively fast compared to a file backup because seeking is reduced. In particular, during an image backup, blocks are generally read sequentially with relatively limited seeking. In contrast, during a file backup, blocks that make up individual files may be scattered, resulting in relatively extensive seeking.

Multiple source storages can be backed up to the same destination storage. When these source storages are similar, many of the source storages may contain redundant files, blocks, or data between the various systems. For example, if multiple source storages utilize the same commercial operating system, such as WINDOWS® 8.1, they may store a common set of system files which will have identical blocks. If these source storages are backed up to the same destination storage, these identical blocks will be stored in the destination storage multiple times, resulting in redundant blocks. Redundancy in a destination storage may increase the overall size requirements of destination storage and increase the bandwidth overhead of transporting blocks to the destination storage. To reduce the redundancy in the storage and free extra blocks, a deduplication system can be used with a hash table to determine which blocks are currently stored.

One common problem with deduplication systems and their hash tables is the requirement to make a trade-off between monetary price and ingestion performance based on the structure and media used for the hash table. Typically, either fast data ingestion rates can be obtained at a high monetary cost using fast media or price can be reduced by using a different media with worse ingestion performance. In the typical use case, the hash table is written sporadically across many blocks instead of being written in batches to the storage device. While the highest data rates can be achieved using physical random-access memory (RAM), RAM is relatively expensive. If a flash storage device is used to store the hash table, the flash storage device will suffer performance and reliability penalties as the same regions of the flash storage device are rewritten many times, which happens frequently when hashes are relatively evenly spread across the flash storage device. In addition, while reading from a flash storage device is a relatively quick procedure, writing to a flash storage device is relatively slow and wears on the flash storage device.

The subject matter claimed herein is not limited to embodiments that solve any disadvantages or that operate only in environments such as those described above. Rather, this background is only provided to illustrate one example technology area where some embodiments described herein may be practiced.

SUMMARY

In general, example embodiments described herein relate to creating hybrid image backups of a source storage. The example embodiments disclosed herein may be employed to store image backups in both a deduplication storage and a destination storage, and also to modify the destination storage as additional blocks are added to the deduplication storage. Where hashes of blocks are added to the deduplication system hash data structure, they may be added all at once in order to increase the longevity of the storage on which the hash data structure resides while providing increased performance. In addition, additional blocks may later be added to the deduplication storage and the hashes of those blocks may be added to the hash data structure.

In one example embodiment, a method for creating one or more hybrid image backups of a source storage may include comparing hashes of allocated blocks stored in the source storage at a first point in time to hashes of blocks stored in a deduplication system to determine whether each of the allocated blocks is in a first set of blocks that are stored in the deduplication system or in a second set of blocks that are not stored in the deduplication system; associating locations of the blocks in the first set of blocks stored in the source storage with locations of the corresponding blocks stored in the deduplication system; determining whether the deduplication system is in a read-only state or in a writable state; and in response to the deduplication system being in the read-only state: storing the blocks in the second set of blocks in an image backup separate from the deduplication system; associating locations of the blocks in the second set of blocks stored in the source storage with locations of the corresponding blocks stored in the image backup; and defining a full hybrid image backup of the source storage at the first point in time as a combination of the first set of blocks stored in the deduplication system and the second set of blocks stored in the image backup.

In another example embodiment, a method for creating one or more hybrid image backups of a source storage may include seeding a deduplication system by storing, in the deduplication system, blocks included in one or more files of one or more operating systems, blocks included in one or more files of one or more software applications, or both, and by storing a hash of each of the seeded blocks in a hash data structure; comparing hashes of allocated blocks stored in the source storage at a first point in time to hashes in the hash data structure to determine whether each of the allocated blocks is in a first set of blocks that are stored in the deduplication system or in a second set of blocks that are not stored in the deduplication system; associating locations of the blocks in the first set of blocks stored in the source storage with locations of the corresponding blocks stored in the deduplication system; determining whether the deduplication system is in a read-only state or in a writable state; and in response to the deduplication system being in the read-only state: storing the blocks in the second set of blocks in an image backup separate from the deduplication system; associating locations of the blocks in the second set of blocks stored in the source storage with locations of the corresponding blocks stored in the image backup; and defining a full hybrid image backup of the source storage at the first point in time as a combination of the first set of blocks stored in the deduplication system and the second set of blocks stored in the image backup.

In another example embodiment, a method for creating one or more hybrid image backups of a source storage may include seeding a deduplication system by storing, in the deduplication system, blocks included in one or more files of one or more operating systems, blocks included in one or more files of one or more software applications, or both, and by storing a hash of each of the seeded blocks in a hash data structure; copying the hash data structure into a solid state drive (SSD); placing the SSD in a read-only state; comparing hashes of allocated blocks stored in the source storage at a first point in time to hashes in the hash data structure to determine whether each of the allocated blocks is in a first set of blocks that are stored in the deduplication system or in a second set of blocks that are not stored in the deduplication system; associating locations of the blocks in the first set of blocks stored in the source storage with locations of the corresponding blocks stored in the deduplication system; storing the blocks in the second set of blocks in an image backup separate from the deduplication system; associating locations of the blocks in the second set of blocks stored in the source storage with locations of the corresponding blocks stored in the image backup; and defining a full hybrid image backup of the source storage at the first point in time as a combination of the first set of blocks stored in the deduplication system and the second set of blocks stored in the image backup.

It is to be understood that both the foregoing general description and the following detailed description are explanatory and are not restrictive of the invention as claimed.

BRIEF DESCRIPTION OF THE DRAWINGS

Example embodiments will be described and explained with additional specificity and detail through the use of the accompanying drawings in which:

FIGS. 2A-2C are a schematic block diagram illustrating a timeline of creating a full hybrid image backup, creating an incremental hybrid image backup, and pruning an image backup.

DESCRIPTION OF EMBODIMENTS

Figure 1:
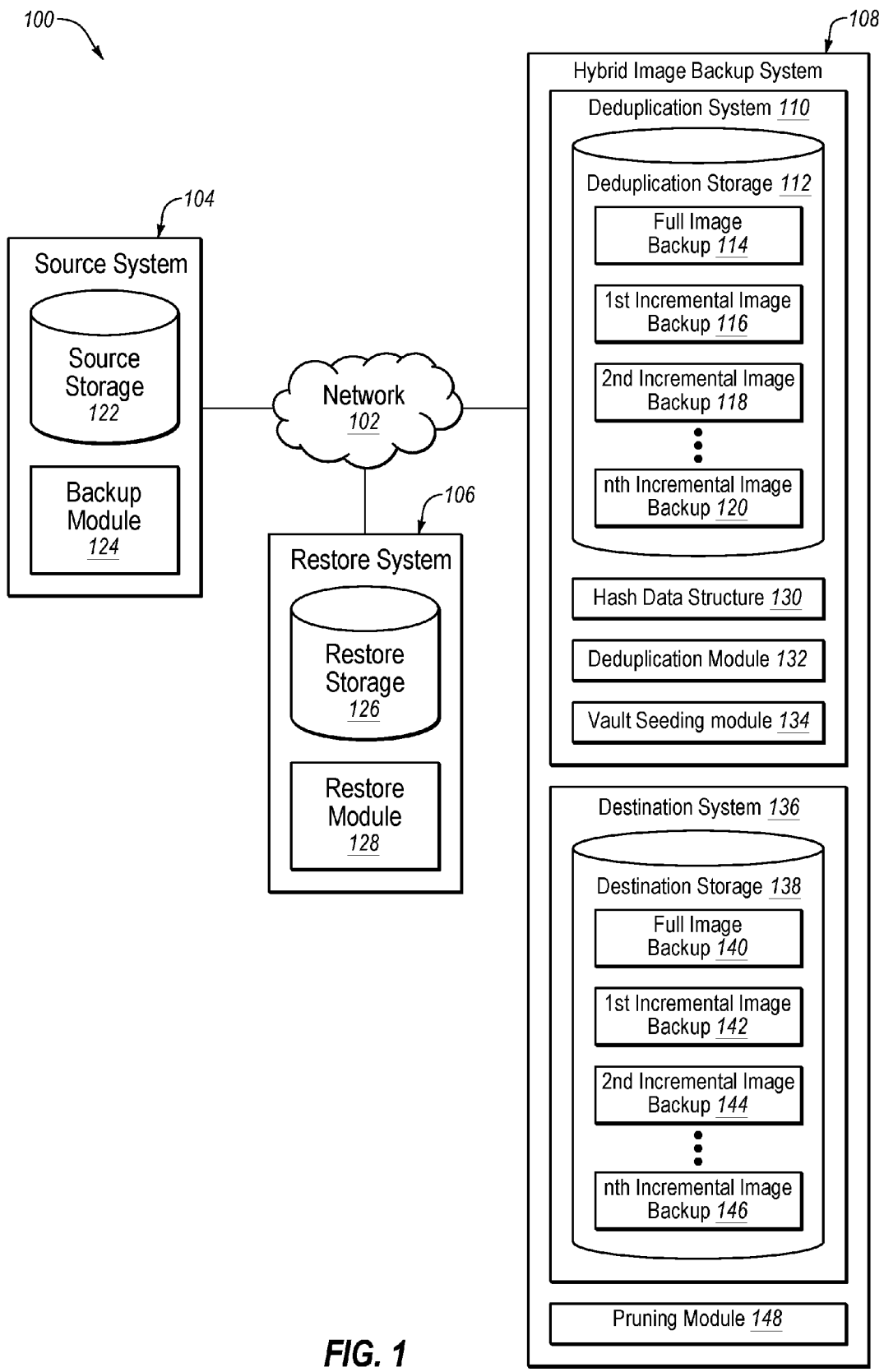
FIG. 1 is a schematic block diagram illustrating an example hybrid image backup and restore system.

The term "storage" as used herein refers to computer-readable media capable of storing data in blocks, such as one or more floppy disks, optical disks, magnetic disks, or solid state drives, flash storage devices, or some logical portion thereof such as a volume. The term "block" as used herein refers to a fixed-length discrete sequence of bits. In some file systems, blocks are sometimes referred to as "clusters." In some example embodiments, the size of each block may be configured to match the standard sector size of a storage on which the block is stored. For example, the size of each block may be 512 bytes (4096 bits) where 512 bytes is the size of a standard sector. In other example embodiments, the size of each block may be configured to be a multiple of the standard sector size of a storage on which the block is stored. For example, the size of each block may be 4096 bytes (32,768 bits) where 512 bytes (4096 bits) is the size of a standard sector, which results in each block including eight sectors. In some file systems, a block is the allocation unit of the file system, with the allocated blocks and free blocks being tracked by the file system. The term "allocated block" as used herein refers to a block in a storage that is currently tracked as storing data by a file system of the storage. The term "free block" as used herein refers to a block in a storage that is not currently tracked as storing data by a file system of the storage. The term "backup" when used herein as a noun refers to a copy or copies of one or more blocks from a storage. The term "full backup" as used herein refers to a full backup of a storage that includes at least a copy of each unique allocated block of the storage at a point in time such that the full backup can be restored on its own to recreate the state of the storage at the point in time, without being dependent on any other backup. A "full backup" may also include nonunique allocated blocks and free blocks of the storage at the point in time. An example file format for a "full backup" is the ShadowProtect Full (SPF) image backup format. The term "incremental backup" as used herein refers to an at least partial backup of a storage that includes at least a copy of each unique allocated block of the storage that was modified between a previous point in time of a previous backup of the storage and the subsequent point in time of the incremental backup, such that the incremental backup, along with all previous backups of the storage, including an initial full backup of the storage, can be restored together as an incremental image backup chain to recreate the state of the storage at the subsequent point in time. An "incremental backup" may also include nonunique allocated blocks and free blocks of the storage that were modified between the previous point in time and the subsequent point in time. An example file format for an "incremental backup" is the ShadowProtect Incremental (SPI) image backup format. The term "modified block" as used herein refers to a block that was modified either because the block was previously allocated and changed or because the block was modified by writing to a newly allocated block. The term "decremental backup" as used herein refers to an at least partial backup of a storage that includes at least a copy of each unique allocated block from a full backup of the storage that corresponds to a block that was modified in the source storage between a previous point in time and a subsequent point in time, such that the decremental backup, along with all subsequent decremental backups of the storage, including a full backup of the storage, can be restored together as a decremental image backup chain to recreate the state of the storage at the previous point in time. A "decremental backup" may also include nonunique allocated blocks and free blocks from a full backup of the storage that correspond to blocks that were modified in the source storage between the point in time and the subsequent point in time. It is understood that a "full backup," an "incremental backup," and/or a "decremental backup" may exclude certain undesired allocated blocks such as blocks belonging to files whose contents are not necessary for restoration purposes, such as virtual memory pagination files and machine hibernation state files.

FIG. 1 is a schematic block diagram illustrating an example hybrid image backup and restore system 100. As disclosed in FIG. 1, the system 100 may include a source system 104, a hybrid image backup system 108, and a restore system 106. The hybrid image backup system may also include a deduplication system 110 and a destination system 136. The systems 104, 106, 110, and 136 may include storages 122, 126, 112, and 138, respectively. The source system 104 may also include a backup module 124 and the restore system 106 may also include a restore module 128. The hybrid image backup system 108 may also include a pruning module 148. The deduplication system 110 may also include a hash data structure 130, a deduplication module 132, and a vault seeding module 134. The systems 104, 108, and 106 may be configured to communicate with one another over a network 102.

The deduplication storage 112 may store one or more image backups of the source storage 122. For example, the deduplication storage 112 may store a full image backup 114, a 1st incremental image backup 116, a 2nd incremental image backup 118, and an nth incremental image backup 120, which together make up an incremental image backup chain. Similarly, the destination storage 138 may store one or more image backups of the source storage 122. For example, the destination storage 138 may store a full image backup 140, a 1st incremental image backup 142, a 2nd incremental image backup 144, and an nth incremental image backup 146, which together make up an incremental image backup chain.

In addition, a combination of the image backups 114-120 and the image backups 140-146 may be defined as a full hybrid image backup or an incremental hybrid image backup of the source storage 122, and together make up an incremental hybrid image backup chain. For example, the full image backup 114 and the full image backup 140 may together define a full hybrid image backup that represents the state of the source storage at time t(1), the 1st incremental image backup 116 and the 1st incremental image backup 142 may together define an incremental hybrid image backup that, combined with prior hybrid image backups, represents the state of the source storage at time t(2), the 2nd incremental image backup 118 and the 2nd incremental image backup 144 may together define an incremental hybrid image backup that, combined with prior hybrid image backups, represents the state of the source storage at time t(2), and the nth incremental image backup 120 and the nth incremental image backup 146 may together define an incremental hybrid image backup that, combined with prior hybrid image backups, represents the state of the source storage at time t(n+1). Any of the hybrid image backups that are defined as a combination of an image backup on the deduplication storage 112 and an image backup on the destination storage 138 may be restored to the restore storage 126.

Each of the systems 104, 108, and 106 may be any computing device capable of supporting a storage and communicating with other systems including, for example, file servers, web servers, personal computers, desktop computers, laptop computers, handheld devices, multiprocessor systems, microprocessor-based or programmable consumer electronics, smartphones, digital cameras, hard disk drives, flash storage devices, and virtual machines. The network 102 may be any wired or wireless communication network including, for example, a Local Area Network (LAN), a Metropolitan Area Network (MAN), a Wide Area Network (WAN), a Wireless Application Protocol (WAP) network, a Bluetooth network, an Internet Protocol (IP) network such as the internet, or some combination thereof. The network 102 may also be a network emulation of a hypervisor over which one or more virtual machines and/or physical machines may communicate.

The incremental hybrid image backup chain stored in both the deduplication storage 112 and the destination storage 138 may be created by the backup module 124. For example, the backup module 124 may be one or more programs that are configured, when executed, to cause one or more processors to perform image backup operations of creating a full hybrid image backup and multiple incremental hybrid image backups of the source storage 122. It is noted that these hybrid image backups may initially be created on the source system 104 and then copied to the hybrid image backup system 108.

Incremental hybrid image backups of the source storage 122 may be created on an ongoing basis. The frequency of creating new incremental hybrid image backups may be altered as desired in order to adjust the amount of data that will be lost should the source storage 122 experience corruption of its stored blocks or become unavailable at any given point in time. The blocks from the source storage 122 can be restored to the state at the point in time of a particular incremental hybrid image backup by applying the hybrid image backups to the restore storage 126 from oldest to newest, namely, first applying the full hybrid image backup and then applying each successive incremental hybrid image backup up to the particular incremental image backup. Alternatively, the blocks from the source storage 122 can be restored to the state at the point in time of a particular incremental hybrid image backup by applying the hybrid image backups to the restore storage 126 concurrently, namely, concurrently applying the full hybrid image backup and each successive incremental hybrid image backup up to the particular incremental hybrid image backup.

The hash data structure 130 may be employed to track information related to the source storage 122, the deduplication storage 112, the destination storage 138, and the hybrid image backups of the source storage 122 that are stored in the hybrid image backup system 108. For example, the hash data structure 130 may contain hashes of all blocks stored in the deduplication storage 112 and thus facilitate verifying if blocks in the source storage 122 are already stored in the deduplication storage 112.

In addition to the creation of hybrid image backups, the hybrid image backup system 108 can also prune the image backups stored in the destination storage 138 through the use of the pruning module 148. The pruning module 148 may be configured to operate when system utilization is below a certain threshold or during certain times of day or at any other point in time. The pruning module 148 may prune out blocks in the image backups stored in the destination storage 138 that are also stored in the deduplication storage 112. The hybrid image backups can then be redefined to reflect the new location of the stored blocks that were pruned out of the image backups stored in the destination storage 138.

Although only allocated blocks are included in the example incremental image backups discussed above, it is understood that in alternative implementations both allocated and free blocks may be backed up during the creation of hybrid image backups. This is typically done for forensic purposes, because the contents of free blocks can be interesting where the free blocks contain data from a previous point in time when the blocks were in use and allocated. Therefore, the creation of hybrid image backups as disclosed herein is not limited to allocated blocks but may also include free blocks.

Further, although only full hybrid image backups and incremental hybrid image backups are discussed above, it is understood that the source storage 122 may instead be backed up by creating a full hybrid image backup and one or more hybrid decremental image backups. Decremental image backups are created by initially creating a full image backup to capture the state at an initial point in time, then updating the full image backup to capture the state at a subsequent point in time by modifying only those blocks in the full image backup that were modified between the initial and subsequent points in time. Prior to the updating of the full image backup, however, any original blocks in the full image backup that correspond to the modified blocks are copied to a decremental image backup, thus enabling restoration of the source storage 122 at the initial point in time (by restoring the updated full image backup and then restoring the decremental image backup) or at the subsequent point in time (by simply restoring the updated full image backup). Since restoring a single full image backup is generally faster than restoring a full image backup and one or more incremental or decremental image backups, creating hybrid decremental image backups instead of incremental hybrid image backups may enable the most recent image backup to be restored more quickly since the most recent image backup is always a full hybrid image backup instead of potentially being an incremental hybrid image backup. Therefore, the methods disclosed herein are not limited to implementation on incremental hybrid image backup chains, but may also include implementation on hybrid decremental image backup chains.

In one example embodiment, the hybrid image backup system 108 may be a network server, the source system 104 may be a first desktop computer, the source storage 122 may be a volume on one or more magnetic hard drives of the first desktop computer, the restore system 106 may be a second desktop computer, the restore storage 126 may be a volume on one or more magnetic hard drives of the second desktop computer, and the network 102 may include the internet. In this example embodiment, the first desktop computer may be configured to periodically back up the volume of the first desktop computer over the internet to the network server as part of a backup job by creating a full hybrid image backup defined as a combination of the full image backups 114 and 140 and creating multiple incremental hybrid image backups defined as a combination of incremental image backups 116 and 142, 118 and 144, and 120 and 146. The first desktop computer may also be configured to track incremental modifications to its volume between backups in order to easily and quickly identify only those blocks that were modified for use in the creation of an incremental backup. The second desktop computer may also be configured to restore one or more of the hybrid image backups from the network server over the internet to the volume of the second desktop computer if the first desktop computer experiences corruption of its volume or if the first desktop computer's volume becomes unavailable.

Although only a single storage is disclosed in each of the systems 104, 106, 110, and 136 in FIG. 1, it is understood that any of the systems 104, 106, 110 and 136 may instead include two or more storages. In addition, although systems 110 and 136 are disclosed with separate storages 112 and 138 respectively, it is understood that systems 110 and 136 may share a single storage. Further, although the systems 104, 108, and 106 are disclosed in FIG. 1 as communicating over the network 102, it is understood that the systems 104, 108, and 106 may instead communicate directly with each other. For example, in some embodiments any combination of the systems 104, 108, and 106 may be combined into a single system. Further, although the backup module 124, the restore module 128, the deduplication module 132, the vault seeding module 134, and the pruning module 148 are the only modules disclosed in the system 100 of FIG. 1, it is understood that the functionality of the modules 124, 128, 132, 134, and 148 may be replaced or augmented by one or more similar modules residing on any of the systems 104, 108, or 106 or another system. Finally, although only a single source storage and a single restore storage are disclosed in the system 100 of FIG. 1, it is understood that the hybrid image backup system 108 of FIG. 1 may be configured to simultaneously back up multiple source storages and/or to simultaneously restore to multiple restore storages. For example, because the hybrid image backup system 108 is configured as a deduplication system, the greater the number of storages that are backed up to the hybrid image backup system 108, the greater the likelihood for reducing redundancy and for reducing the overall number of blocks being backed up, resulting in corresponding decreases in the overall size requirements of the deduplication storage 112 and the destination storage 138 and in the bandwidth overhead of transporting blocks to the deduplication storage 112 and the destination storage 138.

Having described one specific environment with respect to FIG. 1, it is understood that the specific environment of FIG. 1 is only one of countless environments in which the example methods disclosed herein may be practiced. The scope of the example embodiments is not intended to be limited to any particular environment.

Figure 2B:
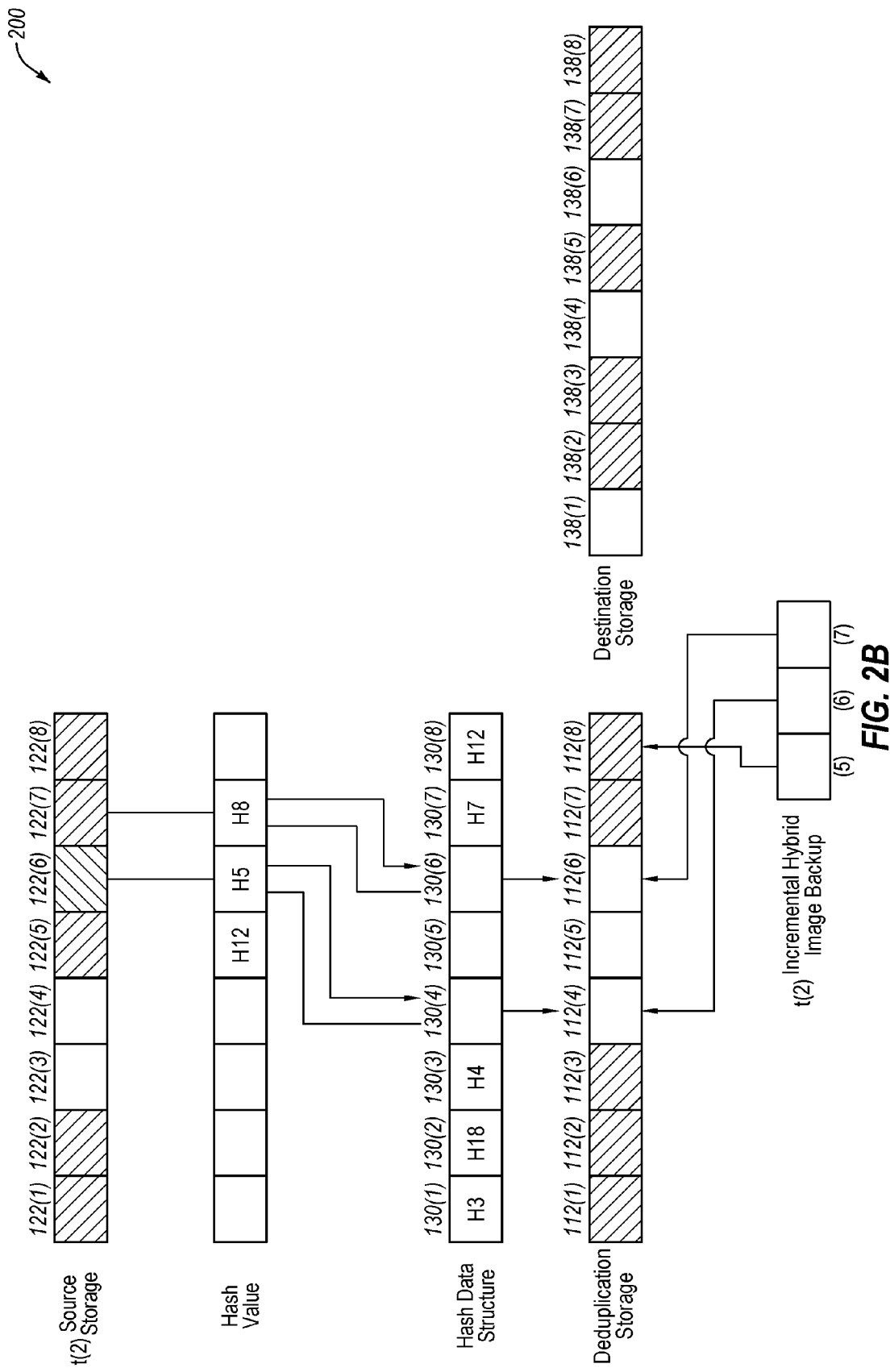

FIGS. 2A-2C are a schematic diagram illustrating a timeline 200 of creating both full and incremental hybrid image backups and pruning blocks out of the hybrid image backups. With continuing reference also to FIG. 1, the timeline 200 of FIGS. 2A-2C discloses the states of the source storage 122 at times t(1), t(2), and t(3), respectively. As noted previously, a full hybrid image backup represents the state of the source storage 122 at time t(1) and the 1st incremental hybrid image backup represents the state of the source storage at time t(2). As disclosed in FIGS. 2A-2C, allocated blocks in the source storage 122, deduplication storage 112, and destination storage 138 are illustrated with a hatch pattern and free blocks are illustrated as blank. Further, hash values for blocks are represented by an 'H' followed by a number. The hash data structure 130 may be employed to track the hash values of blocks that are stored in the deduplication storage 112. Although the source storage 122, the deduplication storage 112, and the destination storage 138 are depicted with eight blocks in FIGS. 2A-2C, it is understood that the source storage 122, the deduplication storage 112, and the destination storage 138 may include millions or billions of blocks, or potentially even more blocks. Also, although the blocks that make up the files that were seeded into the deduplication storage 112 are depicted with only one or two blocks in FIGS. 2A-2C, it is understood that the files may be much larger, such as files including blocks representing several gigabytes (GB) or even terabytes (TB) of data.

As disclosed in FIG. 2A, the state of the source storage 122 at time t(1) includes allocated blocks in positions (1), (2), (4), (6), and (8) and free blocks at positions (3), (5), and (7). Previously to time t(1), blocks included in one or more files of one or more operating systems, blocks included in one or more files of one or more software applications, or both may have been seeded in the deduplication storage 112 and hashes of each of the seeded blocks may have been stored in the hash data structure 130 by the vault seeding module 134 of FIG. 1. For example, the blocks at positions (1) and (7) of deduplication storage 112 may be included in a file of a standard operating system, such as WINDOWS® 8.1 Professional. Hash values H3 and H7 may represent the hash values of those blocks and may be stored in the hash data structure 130 at positions (1) and (7), respectively. Similarly, the blocks at positions (3) and (8) of deduplication storage 112 may be included in a file of a software application such as MICROSOFT® Word 2013 or MICROSOFT® Excel 2013. Hash values H4 and H12 may represent the hash values of those blocks and may be stored in the hash data structure 130 at positions (3) and (8) respectively. In addition, prior to time t(1), one or more other source storages may have backed up blocks to the destination storage 138. For example, in an alternative embodiment, the blocks at positions (3) and (7) may instead represent blocks that were copied from a different source system or source storage to the destination storage 138.

At time t(1), the backup module 124 of FIG. 1 may be employed to compare the hash values of the blocks in the source storage 122 to the hashes of blocks stored in the deduplication storage 112 of the deduplication system 110 to determine whether each of the blocks is in the deduplication storage 112 of the deduplication system 110. The hashes may be calculated according to a hashing algorithm such as a calculated checksum, CRC-32, MD5, SHA-1, SHA-256, SHA-512, or any other hashing algorithm. As disclosed in FIG. 2A, the blocks in positions (1), (2), (4), (6), and (8) have hashes of H7, H18, H3, H2, and H13 respectively. These hashes are then compared to the hashes in the hash data structure 130. The hash data structure 130 has hash value H3 in position (1) and hash value H7 in position (7). Thus, the source storage blocks in positions (1) and (4) are in a first set of blocks that are stored in the deduplication system 110 while the blocks in positions (2), (6), and (8) are in a second set of blocks that are not stored in the deduplication system 110. The locations of the blocks in the first set of blocks may then be associated with the locations of the corresponding blocks with the same hash values stored in the deduplication storage 112 of the deduplication system 110. Thus, the source storage block in position (1) may be associated with the deduplication storage block in position (7) and the source storage block in position (4) may be associated with the deduplication storage block in position (1).

Because the deduplication system 110 is in a read-only state, the backup module 124 may then store the blocks in the second set of blocks, namely the blocks in positions (2), (6), and (8), in the destination storage 138 at positions (2), (5), and (8) respectively. The locations of the blocks in the second set of blocks may then be associated with the locations of the corresponding blocks stored in the destination storage 138. Thus, the source storage block in position (2) may be associated with the destination storage block in position (2), the source storage block in position (6) may be associated with the destination storage block in position (5), and the source storage block in position (8) may be associated with the destination storage block in position (8).

The full hybrid image backup of the source storage 122 at time t(1) may then be defined, as disclosed in FIG. 2A, as a combination of the first set of blocks stored in the deduplication storage 112 and the second set of blocks stored in the destination storage 138. As thus defined, the full hybrid image backup of the source storage blocks in positions (1), (2), (4), (6), and (8) is defined as the blocks in deduplication storage position (7), destination storage position (2), deduplication storage position (1), destination storage position (5), and destination storage position (8) respectively.

As disclosed in FIG. 2B, the state of the source storage 122 at time t(2) includes allocated blocks in positions (1), (2), (5), (6), (7), and (8) and free blocks in positions (3) and (4). After time t(1), and previous to time t(2), the deduplication system 110 may be switched from the read-only state to the writable state. The deduplication system 110 may then be seeded by storing in the deduplication storage 112 blocks included in one or more files of an operating system or blocks included in one or more files of a software application. For example, between time t(1) and time t(2) the deduplication system 110 may have been switched from a read-only state to a writable state. Further, the deduplication storage 112 of the deduplication system 110 may then have been seeded with an additional block in position (2) and a hash of the block at position (2) may have been stored in the hash data structure 130 at position (2). This block may represent a block included in one or more files of a software application such as MICROSOFT® PowerPoint 2013. In addition, between t(1) and time t(2), the source storage block in position (4) has been deleted from the source storage 122 and the source storage block in position (6) has been modified.

At time t(2), as disclosed in FIG. 2B, the backup module 124 of FIG. 1 may be employed to compare the hash values of second allocated blocks stored in the source storage that were modified between time t(1) and time t(2) to the hashes of blocks stored in the deduplication system 110 to determine whether each of the blocks is in the deduplication system 110. As disclosed in FIG. 2B, the blocks in positions (5), (6), and (7) have been modified between time t(1) and time t(2) and have hashes of H12, H5, and H8 respectively. These hashes are then compared to the hashes in the hash data structure 130. The hash data structure 130 has hash value H12 in position (8). Thus, the source storage block in position (5) is in a third set of blocks that are stored in the deduplication system 110 while the blocks in positions (6) and (7) are in a fourth set of blocks that are not stored in the deduplication system 110. The locations of the blocks in the third set of blocks may then be associated with the locations of the corresponding blocks with the same hash values stored in the deduplication system 110. Thus, the source storage block in position (5) may be associated with the deduplication storage block in position (8).

Because the deduplication system 110 is in a writable state, the backup module 124 may then store the blocks in the fourth set of blocks, namely the source storage blocks in positions (6) and (7), in the deduplication storage 112 at positions (4) and (6) respectively. The locations of the blocks in the fourth set of blocks may then be associated with the locations of the corresponding blocks stored in the deduplication storage 112. Thus, the source storage block in position (6) may be associated with the deduplication storage block in position (4) and the source storage block in position (7) may be associated with the deduplication storage block in position (6).

The incremental hybrid image backup of the source storage 122 at time t(2) may then be defined as a combination of the third set of blocks stored in the deduplication storage 112 and the fourth set of blocks stored in the deduplication storage 112. As thus defined, the incremental hybrid image backup of the source storage blocks in positions (5), (6), and (7) is defined as the blocks in deduplication storage position (8), deduplication storage position (4), and deduplication storage position (6) respectively.

As disclosed in FIG. 2C, the state of the destination storage 138 at time t(3) includes allocated blocks in positions (2), (3), (5), (7), and (8) and free blocks in positions (1), (4), and (6). At time t(3), the pruning module 148 may be employed to compare the hash values of blocks stored in the destination storage 138 to hashes of blocks stored in the deduplication storage 112 to determine whether any of the blocks in the second set of blocks are stored in the deduplication system 110. As disclosed in FIG. 2C, the blocks in the destination storage 138 have hashes of H18, H15, H2, H11, and H13. These hashes are then compared to the hashes in the hash data structure 130. The hash data structure 130 has hash value H18 in position (2). Because the destination storage block in position (2) is in the second set of blocks that is stored in the deduplication system 110, the pruning module 148 may then associate the original location of the destination storage block in position (2) with the location of the corresponding block stored in the deduplication storage, located in position (2). At time t(4), the pruning module 148 may then prune the block from the destination storage 138, resulting in no block being stored in the destination storage in position (2). As a result, after pruning at time t(4), the destination storage 138 includes allocated blocks in positions (3), (5), (7), and (8) and free blocks in positions (1), (2), (4), and (6), with the block in position (2) being newly freed.

The full hybrid image backup that represents the state of the source storage 122 at time t(1) may then be redefined as a combination of the first set of blocks stored in the deduplication storage 112 and the second set of blocks stored in the destination storage 138. As thus redefined, the full hybrid image backup of the source storage blocks in positions (1), (2), (4), (6), and (8) is defined as the blocks in deduplication storage position (7), deduplication storage position (2), deduplication storage position (1), destination storage position (5), and destination storage position (8), respectively. The source storage block in position (2), which was previously associated with the destination storage block in position (2), is now associated with the deduplication storage block in position (2).

Figure 3A:
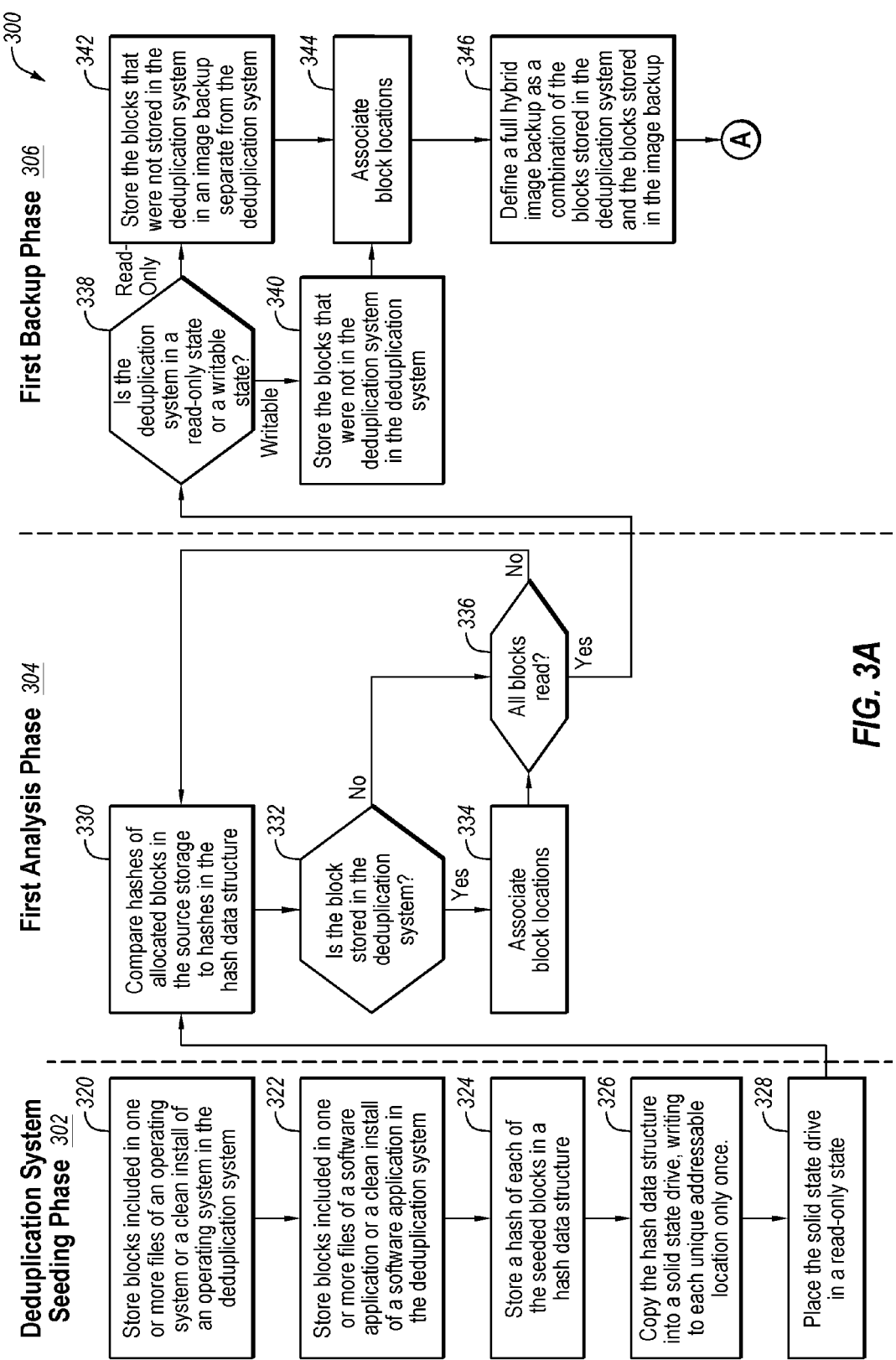
FIGS. 3A-3C are a schematic flowchart illustrating an example method for creating and pruning hybrid image backups.
Figure 3B:
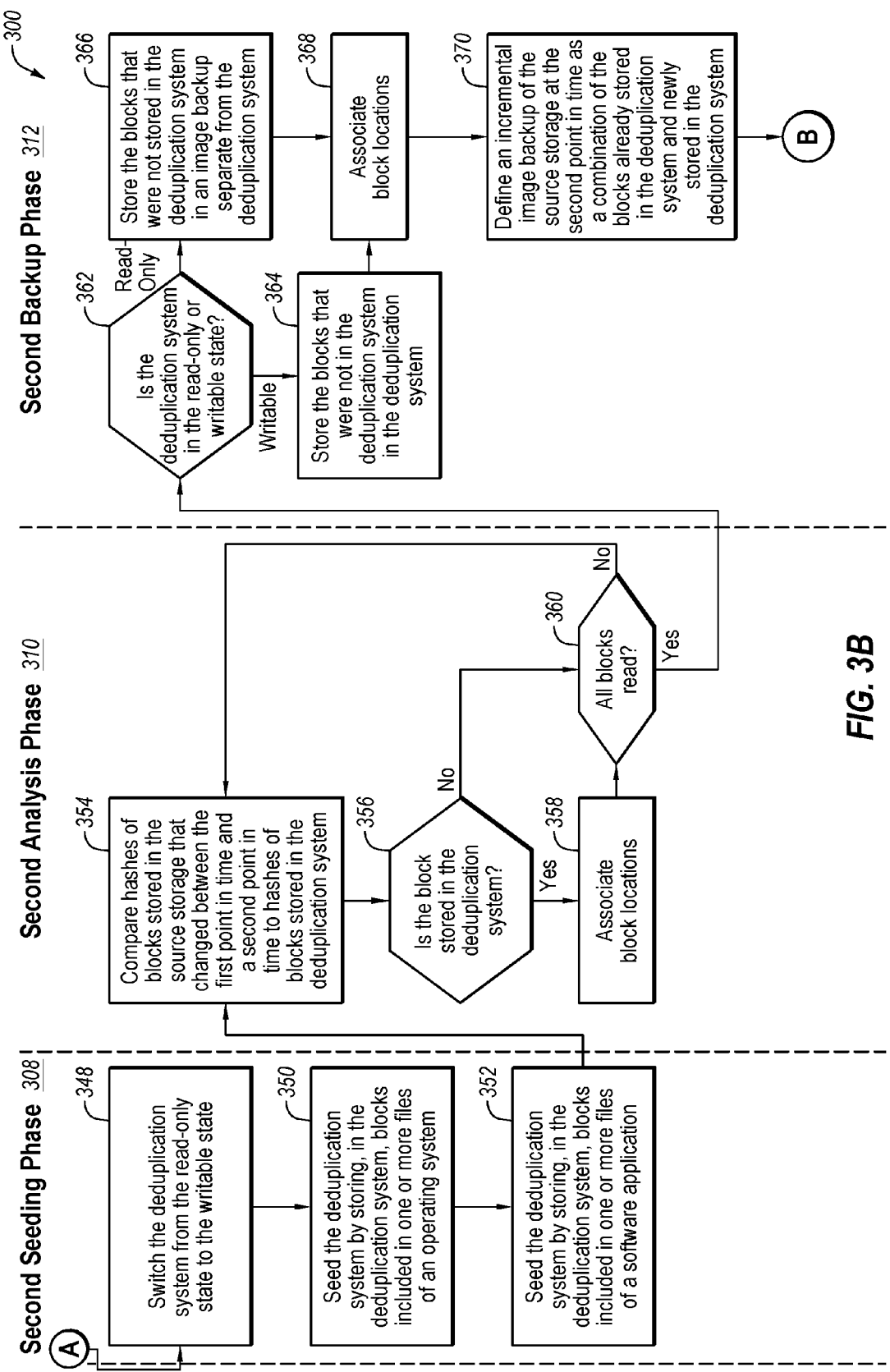
Figure 3C:
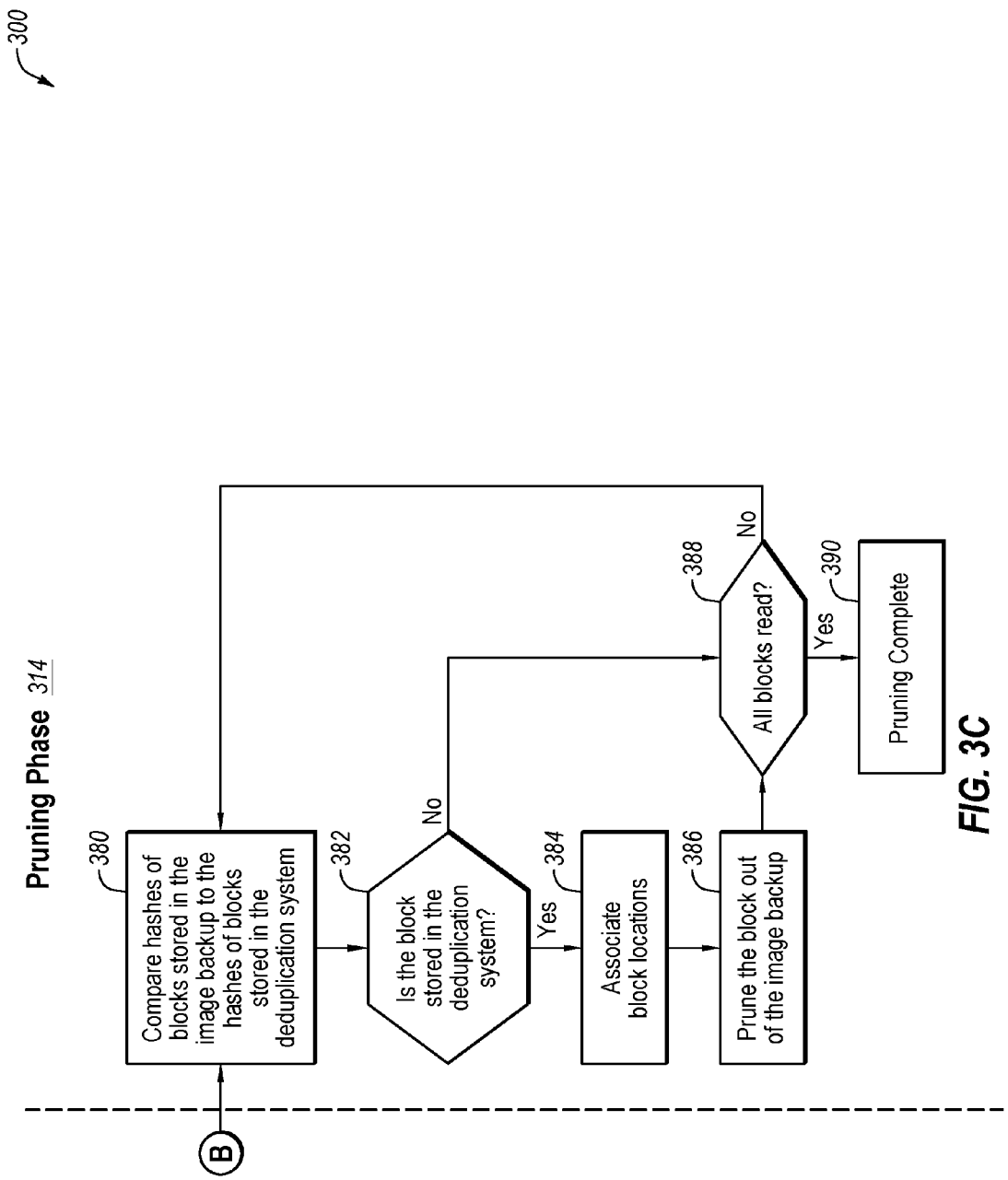

FIGS. 3A-3C are a schematic flowchart illustrating an example method 300 for creating and pruning hybrid image backups. The method 300 may be implemented, in at least some embodiments, by the backup module 124 of FIG. 1, the deduplication module 132 of FIG. 1, the vault seeding module 134 of FIG. 1, and the pruning module 148 of FIG. 1. For example, the backup module 124, the deduplication module 132, the vault seeding module 134, and the pruning module 148 may be one or more programs, stored on one or more non-transitory computer readable media, that are configured, when executed, to cause one or more processors to perform operations of creating and pruning hybrid image backups, as represented by one or more of the phases 302-314 and one or more of steps 320-390 of the method 300. Although illustrated as discrete phases and steps, various phases or steps may be divided into additional phases or steps, combined into fewer phases or steps, reordered, or eliminated, depending on the desired implementation. Also, prior to the method 300, various image backups, such as full, incremental, or decremental image backups, may have been created of a source storage on a source system analogous to source system 104 and then stored in the destination storage 138. For example, prior to the method 300 image backups may have backed up the blocks at positions (3) and (7) of the destination storage 138 of FIG. 2A from another source storage. The method 300 will now be discussed with reference to FIGS. 1-3C.

The method 300 may include a deduplication system seeding phase 302, a first analysis phase 304, a first backup phase 306, a second seeding phase 308, a second analysis phase 310, a second backup phase 312, and a pruning phase 314.

The deduplication system seeding phase 302 of the method 300 may include step 320 of storing blocks included in one or more files of an operating system or a clean install of an operating system in the deduplication system. For example, the vault seeding module 134 of FIG. 1 may seed, at step 320, the blocks included in a file of a standard operating system, such as WINDOWS® 8.1 Professional, into positions (1) and (7) of the deduplication storage 112 as disclosed in FIG. 2A.

The deduplication system seeding phase 302 of the method 300 may include step 322 of storing blocks included in one or more files of a software application or a clean install of a software application in the deduplication system. Continuing with the above example, the vault seeding module 134 of FIG. 1 may seed, at step 322, the blocks included in a file of a software application, such as MICROSOFT® Word 2013 or MICROSOFT® Excel 2013, into positions (3) and (8) of the deduplication storage 112 as disclosed in FIG. 2A.

The deduplication system seeding phase 302 of the method 300 may include step 324 of storing a hash of each of the seeded blocks in a hash data structure. Continuing with the above example, the vault seeding module 134 of FIG. 1 may store, at step 324, hash values of the blocks seeded in steps 320 and 322, namely hashes H3, H4, H7, and H12, computed according to a hashing algorithm, in the hash data structure 130 in positions (1), (3), (7), and (8), respectively, as disclosed in FIG. 2A.

The deduplication system seeding phase 302 of the method 300 may include step 326 of copying the hash data structure into a solid state drive (SSD), writing to each unique addressable location only once. This step may prevent unnecessary wearing operations from occurring on the SSD while providing the performance benefits that are enabled by reading from an SSD.

It is understood that in at least some example embodiments, however, that step 326 may be eliminated where the hash data structure 130 is initially stored and updated on the SSD. Elimination of step 326 may avoid the time and expense of the copying performed at step 326. Further, elimination of step 326 may be employed where the SSD upon which the hash data structure 130 is initially stored and updated has acceptably high wear tolerance levels to handle the writes of the hashes that are stored in the hash data structure 130 during step 324.

The deduplication system seeding phase 302 of the method 300 may include step 328 of placing the solid state drive in a read-only state. Placing the solid state drive in the read-only state may prevent later write operations from being made to the solid state drive or additional blocks from being seeded to the deduplication system.

The first analysis phase 304 of the method 300 may include step 330 of comparing hashes of allocated blocks in the source storage to hashes in the hash data structure. Continuing with the above example, the deduplication module 132 of FIG. 1 may calculate, at step 330, hash values of allocated blocks in source storage 122 and compare the hash values to the hash values in the hash data structure 130. In particular, the deduplication module 132 may calculate hash values of H7, H18, H3, H2, and H13 for the allocated blocks in the source storage 122 and compare those hash values to the hashes in the hash data structure 130 of H3, H4, H7, and H12 as disclosed in FIG. 2A.

The first analysis phase 304 may include step 332 of determining if a block is stored in the deduplication system. For example, the deduplication module 132 of FIG. 1 may determine that a block is stored in the deduplication system 110 if the hash value of the block matches a hash value that is stored in the hash data structure 130. Continuing with the above example. the deduplication module 132 may determine, at step 332, that the blocks in positions (1) and (4) of source storage 122 are already stored in the deduplication system 110 because the hash values of those blocks, H7 and H3 respectively, match hash values stored in the hash data structure 130 in positions (7) and (1) respectively (Yes at step 332). Similarly, the deduplication module 132 may determine that the blocks in positions (2), (6), and (8) are not stored in the deduplication system 110 because the hash values of those blocks do not match any hash values stored in the hash data structure 130 (No at step 332).

If it is determined at step 332 that the block is stored in the deduplication system (Yes at step 332), then the first analysis phase 304 may proceed to step 334 of associating the block locations. Continuing with the above example, the deduplication module 132 of FIG. 1 may associate the block located in position (1) of source storage 122 with the block located in position (7) of the deduplication storage 112 and the block located in position (4) of source storage 122 with the block located in position (1) of the deduplication storage 112 as disclosed in the Full Hybrid Image Backup of FIG. 2A.

Alternatively, if it is determined at step 332 that the block is not stored in the deduplication system (No at step 332), or after associating the block locations in step 334, then the first analysis phase 304 of the method 300 may proceed to step 336 of determining whether all allocated blocks in the source storage have been read. If it is determined that all of the allocated blocks in the source storage have been read (Yes at step 336), then the method 300 may proceed to the first backup phase 306. If it is determined that not all of the allocated blocks in the source storage have been read (No at step 336), the method 300 may return to step 330 and continue with the next allocated block.

The first backup phase 306 of the method 300 may include step 338 of determining if the deduplication system is in a read-only state or a writable state. Continuing with the above example, the backup module 124 of FIG. 1 may determine that an SSD that contains the hash data structure 130 has been placed in a read-only state or that the SSD that contains the hash data structure 130 has been placed in a writable state.

If it is determined at step 338 that the deduplication system is in the writable state (Writable at step 338), then the first backup phase 306 the method 300 may proceed to step 340 of storing the blocks that were not in the deduplication system in the deduplication system. Continuing with the above example, the backup module 124 of FIG. 1 may write, at step 340, the blocks that were determined in step 332 to not be stored in the deduplication storage 112 of the deduplication system 110 in the deduplication system 110 and may also update the hash data structure 130 of FIG. 1 with hash values of the blocks that were stored in the deduplication storage 112 of the deduplication system 110.

Alternatively, if it is determined at step 338 that the deduplication system is in the read-only state (Read-only at step 338), then the method 300 may proceed to step 342 of storing the blocks that were not stored in the deduplication system 110 in an image backup separate from the deduplication system 110. Continuing with the above example, the backup module 124 of FIG. 1 may write the blocks that were determined in step 332 to not be stored in the deduplication storage 112 of the deduplication system 110 in an image backup separate from the deduplication system 110, such as in an image backup in the destination storage 138 of FIG. 1. In particular, the backup module 124 may store the blocks in positions (2), (6), and (8) of source storage 122 in positions (2), (5), and (8) of the destination storage 138, respectively, as disclosed in FIG. 2A.

The first backup phase 306 of the method 300 may include step 344 of associating block locations. Continuing with the above example, the deduplication module 132 of FIG. 1 may associate, at step 344, the block located in position (2) of source storage 122 with the block located in position (2) of the destination storage 138, the block located in position (6) of source storage 122 with the block located in position (5) of the destination storage 138, and the block located in position (8) of source storage 122 with the block located in position (8) of the destination storage 138 as disclosed in the Full Hybrid Image Backup of FIG. 2A.

The first backup phase 306 of the method 300 may include step 346 of defining a full hybrid image backup as a combination of the blocks stored in the deduplication system and the blocks stored in the image backup. Continuing with the above example, the deduplication module 132 of FIG. 1 and/or the backup module 124 of FIG. 1 may define, at step 346, a full hybrid image backup at time t(1) as the combination of blocks in positions (1) and (7) of deduplication storage 112, corresponding to blocks in positions (4) and (1) of source storage 122, respectively, and blocks in positions (2), (5), and (8) of destination storage 138, corresponding to blocks in positions (2), (6), and (8) of source storage 122, respectively, as disclosed in FIG. 2A.

The second seeding phase 308 of the method 300 may include step 348 of switching the deduplication system from the read-only state to the writable state. Continuing with the above example, the deduplication module 132 of FIG. 1 may switch, at step 348, the deduplication system 110 from the read-only state to the writable state by changing a setting on the deduplication storage 112 that may allow the deduplication storage 112 and the hash data structure 130 to receive new writes.

The second seeding phase 308 of the method 300 may include step 350 of seeding the deduplication system by storing, in the deduplication system, blocks included in one or more files of an operating system. Continuing with the above example, the vault seeding module 134 of FIG. 1 may seed, at step 350, the blocks included in a file of a standard operating system, such as WINDOWS® 8.1 Professional into the deduplication storage 112.

The second seeding phase 308 may include step 352 of seeding the deduplication system by storing, in the deduplication system, blocks included in one or more files of a software application. Continuing with the above example, the vault seeding module 134 of FIG. 1 may seed, at step 352, the blocks included in a file of a software application, such as MICROSOFT® PowerPoint 2013, into position (2) of the deduplication storage 112 as disclosed in FIG. 2B. The vault seeding module 134 of FIG. 1 may also store a hash value of the block in position (2) of the hash data structure 130 as disclosed in FIG. 2B.

After step 346 and before step 354, various modifications may occur to the source storage 122. Files may be deleted, created, or otherwise modified, which may result in modifications to the blocks that make up those files. Continuing with the above example, the block in position (4) of source storage 122 was deleted prior to time t(2); the block in position (6) of source storage 122 was modified prior to time t(2); and the blocks in positions (5) and (7) of source storage 122 were newly written prior to time t(2), as disclosed in FIG. 2B.

The second analysis phase 310 of the method 300 may include step 354 of comparing hashes of blocks stored in the source storage that were modified between the first point in time and a second point in time to hashes of blocks stored in the deduplication system. The method 300 may track modifications to the storage in a modify map, may use snapshot technology, and/or may use any other means for tracking the modifications to blocks in the storage. Continuing with the above example, the deduplication module 132 of FIG. 1 may calculate, at step 354, hash values of blocks in source storage 122 that were modified between time t(1) and time t(2) and compare the hash values to the hash values in the hash data structure 130. Continuing with the above example, the deduplication module 132 may calculate hash values of H12, H5, and H8 for the blocks in the source storage 122 that were modified between the time t(1) and time t(2) and compare those hash values to the hashes in the hash data structure 130 of H3, H18, H4, H7, and H12, as disclosed in FIG. 2A.

The second analysis phase 310 of the method 300 may include step 356 of determining if a block is stored in the deduplication system. For example, the deduplication module 132 of FIG. 1 may determine, at step 356, that a block is stored in the deduplication storage 112 of the deduplication system 110 if the hash value of the block matches a hash value that is stored in the hash data structure 130. Continuing with the above example, the deduplication module 132 may determine that the block in position (5) of source storage 122 is already stored in the deduplication system 110 because the hash value of that block, H12, matches a hash value stored in the hash data structure 130 in position (8).

Similarly, the deduplication module 132 may determine that the blocks in positions (6) and (7) are not stored in the deduplication system 110 because the hash values of those blocks do not match any hash values stored in the hash data structure 130.

If it is determined at step 356 that the block is stored in the deduplication system (Yes at step 356), then the second analysis phase 310 may proceed to step 358 of associating the block locations. Continuing with the above example, the deduplication module 132 of FIG. 1 may associate, at step 358, the block located in position (5) of source storage 122 with the block located in position (8) of the deduplication storage 112 as disclosed in the Incremental Hybrid Image Backup of FIG. 2B.

Alternatively, if it is determined in step 356 that the block is not stored in the deduplication system (No at step 356) or after associating the block locations in step 358, the second analysis phase 310 of the method 300 may include step 360 of determining whether all allocated blocks in the source storage have been read. If it is determined that all of the blocks that have been modified between the first point in time and second point in time have been read (Yes at step 360), the method 300 may proceed to the second backup phase 312. If it is determined that not all of the blocks that have been modified between the first point in time and second point in time have been read (No at step 360), the method 300 may return to step 354 and continue with the next allocated block.

The second backup phase 312 of the method 300 may include step 362 of determining if the deduplication system is in the read-only or writable state. For example, the backup module 124 of FIG. 1 may determine that an SSD that contains the hash data structure 130 has been placed in a read-only state or that the SSD that contains the hash data structure 130 has been placed in a writable state.

If it is determined at step 362 that the deduplication system is in the writable state (Writable at step 362), then the second backup phase 312 of the method 300 may proceed to step 364 of storing the blocks that were not in the deduplication system in the deduplication system. Continuing with the above example, the backup module 124 of FIG. 1 may write, at step 364, the blocks that were determined in step 356 to not be stored in the deduplication system 110 in the deduplication storage 112 of the deduplication system 110 and to update the hash data structure 130 of FIG. 1 with hash values of the blocks that were stored in the deduplication storage 112 of the deduplication system 110. In particular, the deduplication module 132 of FIG. 1 may store the blocks in positions (6) and (7) of source storage 122 in positions (4) and (6) of destination storage 138 respectively as disclosed in FIG. 2B.

If it is determined at step 362 that the deduplication system is in the read-only state (read-only at step 362), then the second backup phase 312 of the method 300 may proceed to step 366 of storing the blocks that were not stored in the deduplication system in an image backup separate from the deduplication system. For example, the backup module 124 of FIG. 1 may write, at step 366, the blocks that were determined in step 356 to not be stored in the deduplication system 110 in an image backup separate from the deduplication system 110, such as in an image backup in the destination storage 138 of FIG. 1.

The second backup phase 312 of the method 300 may include step 368 of associating block locations. Continuing with the above example, the deduplication module 132 of FIG. 1 may associate, at step 368, the block located in position (6) of source storage 122 with the block located in position (4) of the deduplication storage 112 and the block located in position (7) of source storage 122 with the block located in position (6) of the deduplication storage 112 as disclosed in the Incremental Hybrid Image Backup of FIG. 2B.

The second backup phase 312 of the method 300 may include step 370 of defining an incremental hybrid image backup of the source storage at the second point in time as a combination of the blocks stored in the deduplication system and the blocks newly stored in the deduplication system. Continuing with the above example, the deduplication module 132 of FIG. 1 and/or the backup module 124 of FIG. 1 may define an incremental hybrid image backup at time t(2) as the combination of the block in position (8) of deduplication storage 112, corresponding to the block in position (5) of source storage 122 and blocks in positions (4) and (6) of deduplication storage 112, corresponding to blocks in positions (6) and (7) of source storage 122, respectively, as disclosed in FIG. 2B.

The pruning phase 314 of the method 300 may include step 380 of comparing hashes of blocks stored in the image backup to the hashes of blocks stored in the deduplication system. Continuing with the above example, the pruning module 148 of FIG. 1 may calculate, at step 380, hash values of blocks in destination storage 138 and compare the hash values to the hash values in the hash data structure 130. In particular, the deduplication module 132 may calculate hash values of H18, H15, H2, H11, and H13 for the blocks in the destination storage 138 in positions (2), (3), (5), (7), and (8), respectively, and compare those hash values to the hashes in the hash data structure 130 of H3, H18, H4, H5, H8, H7, and H12 for the blocks in deduplication storage 112 in positions (1), (2), (3), (4), (6), (7), and (8), respectively, as disclosed in FIG. 2C.

The pruning phase 314 of the method 300 may include step 382 of determining if a block is stored in the deduplication system. For example, the pruning module 148 of FIG. 1 may determine, at step 382, that a block is stored in the deduplication system 110 if the hash value of the block matches a hash value that is stored in the hash data structure 130. Continuing with the above example, the pruning module 148 may determine, at step 382, that the block in position (2) of destination storage 138 is already stored in the deduplication system 110 (Yes at step 382) because the hash value of that block, H18, matches a hash value stored in the hash data structure 130 in position (2). Similarly, the deduplication module 132 may determine, at step 382, that the blocks in positions (3), (5), (7), and (8) are not stored in the deduplication system 110 (No at step 382) because the hash values of those blocks do not match any hash values stored in the hash data structure 130.

If it is determined at step 382 that the block is stored in the deduplication system (Yes at step 382), then the pruning phase 314 of the method 300 may proceed to step 384 of associating block locations. Continuing with the above example, the pruning module 148 of FIG. 1 may associate the block located in position (2) of source storage 122 with the block located in position (2) of the deduplication storage 112 as disclosed in the Full Hybrid Image Backup of FIG. 2C.

The pruning phase 314 may include step 386 of pruning the block out of the image backup. Continuing with the above example, the pruning module 148 of FIG. 1 may prune, at step 386, the block in position (2) of the destination storage 138 out of the destination storage 138 at time t(4), freeing the position to be used by other blocks, as disclosed in FIG. 2C.

If it is determined in step 382 that the block is not stored in the deduplication system (No at step 382) or after pruning the block out of the image backup in step 386, the pruning phase 314 of the method 300 may include step 388 of determining whether all allocated blocks in the destination storage have been read. If it is determined that all of the blocks in the destination storage have been read (Yes at step 382), the pruning phase 314 may proceed to step 390 and the pruning phase is complete. If it is determined that not all of the allocated blocks in the destination storage have been read (No at step 388), the method 300 may return to step 380 and continue with the next block.

It is understood that the foregoing discussion of the method 300 is but one possible implementation of a method for creating and pruning hybrid image backups, and various modifications are possible and contemplated. For example, the method 300 may be modified to remove one or more steps or rearrange the order of one or more steps.

The embodiments described herein may include the use of a special-purpose or general-purpose computer, including various computer hardware or software modules, as discussed in greater detail below.

Embodiments described herein may be implemented using non-transitory computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including RAM, ROM, EEPROM, CD-ROM or other optical disk storage, magnetic disk storage or other magnetic storage devices, or any other storage medium which may be used to carry or store one or more desired programs having program code in the form of computer-executable instructions or data structures and which may be accessed and executed by a general-purpose computer, special-purpose computer, or virtual computer such as a virtual machine. Combinations of the above may also be included within the scope of computer-readable media.

Computer-executable instructions comprise, for example, instructions and data which, when executed by one or more processors, cause a general-purpose computer, special-purpose computer, or virtual computer such as a virtual machine to perform a certain method, function, or group of methods or functions. Although the subject matter has been described in language specific to structural features and/or methodological steps, it is to be understood that the subject matter defined in the appended claims is not necessarily limited to the specific features or steps described above. Rather, the specific features and steps described above are disclosed as example forms of implementing the claims.

As used herein, the term "module" may refer to software objects or routines that execute on a computing system. The different modules or filters described herein may be implemented as objects or processes that execute on a computing system (e.g., as separate threads). While the system and methods described herein are preferably implemented in software, implementations in hardware or a combination of software and hardware are also possible and contemplated.

All examples and conditional language recited herein are intended for pedagogical objects to aid the reader in understanding the example embodiments and the concepts contributed by the inventor to furthering the art, and are to be construed as being without limitation to such specifically-recited examples and conditions.

The invention claimed is:

1. A method for creating one or more hybrid image backups of a source storage, the method comprising:
   comparing hashes of allocated blocks stored in the source storage at a first point in time to hashes of blocks stored in a deduplication system to determine whether each of the allocated blocks is in a first set of blocks that are stored in the deduplication system or in a second set of blocks that are not stored in the deduplication system;
   associating locations of the blocks in the first set of blocks stored in the source storage with locations of the corresponding blocks stored in the deduplication system;
   determining whether the deduplication system is in a read-only state or in a writable state; and
   in response to the deduplication system being in the read-only state:
      storing the blocks in the second set of blocks in an image backup separate from the deduplication system;
      associating locations of the blocks in the second set of blocks stored in the source storage with locations of the corresponding blocks stored in the image backup; and
      defining a full hybrid image backup of the source storage at the first point in time as a combination of the first set of blocks stored in the deduplication system and the second set of blocks stored in the image backup.

2. The method as recited in claim 1, wherein the hashes of the blocks stored in the deduplication system are stored on a solid state drive (SSD).

3. The method as recited in claim 1, wherein the deduplication system was seeded prior to the comparing by storing, in the deduplication system, blocks included in one or more files of an operating system.

4. The method as recited in claim 1, wherein the deduplication system was seeded prior to the comparing by storing, in the deduplication system, blocks included in one or more files of a software application.

5. The method as recited in claim 1, further comprising:
   switching the deduplication system from the read-only state to the writable state; and
   seeding the deduplication system by storing, in the deduplication system, blocks included in one or more files of an operating system.

6. The method as recited in claim 1, further comprising:
   switching the deduplication system from the read-only state to the writable state; and
   seeding the deduplication system by storing, in the deduplication system, blocks included in one or more files of a software application.

7. The method as recited in claim 1, further comprising:
   comparing hashes of second allocated blocks stored in the source storage that were modified between the first point in time and a second point in time to hashes of blocks stored in the deduplication system to determine whether each of the second allocated blocks is in a third set of blocks that are stored in the deduplication system or in a fourth set of blocks that are not stored in the deduplication system;
   associating locations of the blocks in the third set of blocks stored in the source storage with locations of the corresponding blocks stored in the deduplication system;
   determining whether the deduplication system is in the read-only state or in the writable state; and
   in response to the deduplication system being in the writable state:
      storing unique blocks in the fourth set of blocks in the deduplication system;
      associating locations of the blocks in the fourth set of blocks stored in the source storage with locations of the corresponding blocks stored in the deduplication system; and
      defining an incremental image backup of the source storage at the second point in time as a combination of the third set of blocks stored in the deduplication system and the fourth set of blocks stored in the deduplication system.

8. The method as recited in claim 7, further comprising:
   comparing hashes of blocks stored in the image backup to hashes of blocks stored in the deduplication system to determine whether any blocks in the second set of blocks are stored in the deduplication system; and
   in response to one or more blocks in the second set of blocks being stored in the deduplication system:
      associating original locations of the one or more blocks stored in the source storage at the first point in time with locations of the corresponding blocks stored in the deduplication system; and
      pruning the one or more blocks out of the image backup.

9. One or more non-transitory computer-readable media storing one or more programs that are configured, when executed, to cause one or more processors to perform the method as recited in claim 1.

10. A method for creating one or more hybrid image backups of a source storage, the method comprising:
    seeding a deduplication system by storing, in the deduplication system, blocks included in one or more files of one or more operating systems, blocks included in one or more files of one or more software applications, or both, and by storing a hash of each of the seeded blocks in a hash data structure;
    comparing hashes of allocated blocks stored in the source storage at a first point in time to hashes in the hash data structure to determine whether each of the allocated blocks is in a first set of blocks that are stored in the deduplication system or in a second set of blocks that are not stored in the deduplication system;
    associating locations of the blocks in the first set of blocks stored in the source storage with locations of the corresponding blocks stored in the deduplication system;
    determining whether the deduplication system is in a read-only state or in a writable state; and
    in response to the deduplication system being in the read-only state:
       storing the blocks in the second set of blocks in an image backup separate from the deduplication system;
       associating locations of the blocks in the second set of blocks stored in the source storage with locations of the corresponding blocks stored in the image backup; and
       defining a full hybrid image backup of the source storage at the first point in time as a combination of the first set of blocks stored in the deduplication system and the second set of blocks stored in the image backup.

11. The method as recited in claim 10, further comprising:
copying the hash data structure into a solid state drive (SSD) by writing to each unique addressable location in the SSD only once.

12. The method as recited in claim 10, wherein:
the blocks included in the one or more files of the one or more operating systems are blocks included in the one or more files of a clean install of the one or more operating systems; and
the blocks included in the one or more files of the one or more software applications are blocks included in the one or more files of a clean install of the one or more software applications.

13. The method as recited in claim 10, further comprising:
switching the deduplication system from the read-only state to the writable state; and
newly seeding the deduplication system by storing, in the deduplication system, blocks included in one or more files of one or more operating systems, blocks included in one or more files of one or more software applications, or both, and by storing a hash of each of the newly-seeded blocks in the hash data structure.

14. The method as recited in claim 10, further comprising:
comparing hashes of second allocated blocks stored in the source storage that were modified between the first point in time and a second point in time to hashes in the hash data structure to determine whether each of the second allocated blocks is in a third set of blocks that are stored in the deduplication system or in a fourth set of blocks that are not stored in the deduplication system;
associating locations of the blocks in the third set of blocks stored in the source storage with locations of the corresponding blocks stored in the deduplication system;
determining whether the deduplication system is in the read-only state or in the writable state; and
in response to the deduplication system being in the writable state:
storing unique blocks in the fourth set of blocks in the deduplication system;
associating locations of the blocks in the fourth set of blocks stored in the source storage with locations of the corresponding blocks stored in the deduplication system; and
defining an incremental image backup of the source storage at the second point in time as a combination of the third set of blocks stored in the deduplication system and the fourth set of blocks stored in the deduplication system.

15. The method as recited in claim 14, further comprising:
comparing hashes of blocks stored in the image backup to hashes in the hash data structure to determine whether any blocks in the second set of blocks are stored in the deduplication system; and
in response to one or more blocks in the second set of blocks being stored in the deduplication system:
associating original locations of the one or more blocks stored in the source storage at the first point in time with locations of the corresponding blocks stored in the deduplication system; and
pruning the one or more blocks out of the image backup.

16. One or more non-transitory computer-readable media storing one or more programs that are configured, when executed, to cause one or more processors to perform the method as recited in claim 10.

* * * * *